United States Patent [19]
Onuma

[11] Patent Number: 6,129,425
[45] Date of Patent: Oct. 10, 2000

[54] DEVICE FOR JUDGING NORMAL OPERATION OF BRAKE SYSTEM BASED UPON CORRELATION OF PEDAL DEPRESSION STROKE AND MASTER CYLINDER PRESSURE

[75] Inventor: Yutaka Onuma, Susono, Japan

[73] Assignee: Toyota Jidosha Kabushiki Kaisha, Toyota, Japan

[21] Appl. No.: 09/263,219

[22] Filed: Mar. 5, 1999

[30] Foreign Application Priority Data

Apr. 16, 1998 [JP] Japan .................................. 10-122890

[51] Int. Cl.⁷ ...................................................... B60T 7/12
[52] U.S. Cl. ......................................... 303/155; 303/113.4
[58] Field of Search ............................... 303/113.4, 155, 303/DIG. 1, DIG. 4

[56] References Cited

U.S. PATENT DOCUMENTS

| | | | |
|---|---|---|---|
| 4,678,243 | 7/1987 | Leiber | 303/155 |
| 4,776,643 | 10/1988 | Leiber | 303/114.1 |
| 5,931,545 | 8/1999 | Yonemura et al. | 303/125 |
| 5,978,725 | 11/1999 | Kagawa | 707/70 |
| 5,984,429 | 11/1999 | Nell et al. | 303/113.4 |
| 6,007,160 | 12/1999 | Lubbers et al. | 303/114.1 |

FOREIGN PATENT DOCUMENTS

| | | |
|---|---|---|
| 5-184007 | 7/1993 | Japan . |
| WO 95/16593 | 6/1995 | WIPO . |

*Primary Examiner*—Matthew C. Graham
*Attorney, Agent, or Firm*—Oliff & Berridge, PLC

[57] ABSTRACT

In a device for judging a normal operation of a brake system of a vehicle such as an automobile by judging if the stroke of the brake pedal depression detected by a stroke sensor and the master cylinder pressure detected by a pressure sensor are correlated with one another within a range determined for a judgment of a normal operation of the brake system, the device detects speed of change of at least one of the stroke and the pressure, and refrains from executing the judgment when at least one of the stroke change speed and the pressure change speed is not smaller than a threshold value determined therefor.

6 Claims, 6 Drawing Sheets

FIG. 8

DEVICE FOR JUDGING NORMAL OPERATION OF BRAKE SYSTEM BASED UPON CORRELATION OF PEDAL DEPRESSION STROKE AND MASTER CYLINDER PRESSURE

BACKGROUND OF THE INVENTION

1. Field of the Invention

The present invention related to a device for judging a normal operation of a brake system of a vehicle such as an automobile, and more particularly, to such a brake system normal operation judging device that is improved not to make a mistake in the detection of the normal operation of the brake system due to variations of actuation thereof by drivers.

2. Description of the Prior Art

In Japanese Patent Laid-open Publication 5-184007 (1993) there is proposed a device for judging a normal operation of a brake system which judges that the brake system is not normally operating when an output of a brake depression sensor is higher than a predetermined value under an off state of a brake lamp switch.

Figure 8:
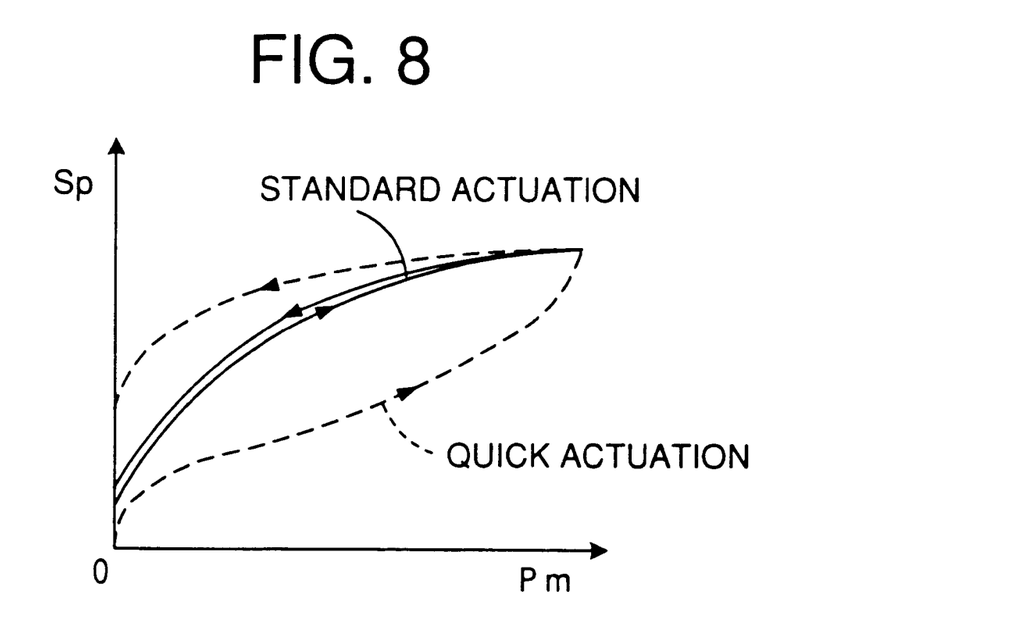
FIG. 8 is a graph showing changes of performance of the correlation between the stroke and the pressure in brake systems of vehicles according to the difference of quickness in depressing the brake pedal.

In the brake systems of vehicles there is generally such a relationship between stroke Sp of a depression of the brake pedal by a driver and pressure Pm generated thereby in the master cylinder as shown in FIG. 8 by a set of up and down solid lines when the brake pedal is depressed at a normal speed, which, however, will change so far as shown by a set of broken up and down lines as the brake depression speed increases. Therefore, when the normal operation of the brake system is judged simply according to whether a normal pattern of brake pedal depression vs. master cylinder pressure is available or not, a mistake can happen in the judgment of the normality of operation of the brake system according to a variation of the manner of depression of the brake pedal by drivers.

Figure 3:
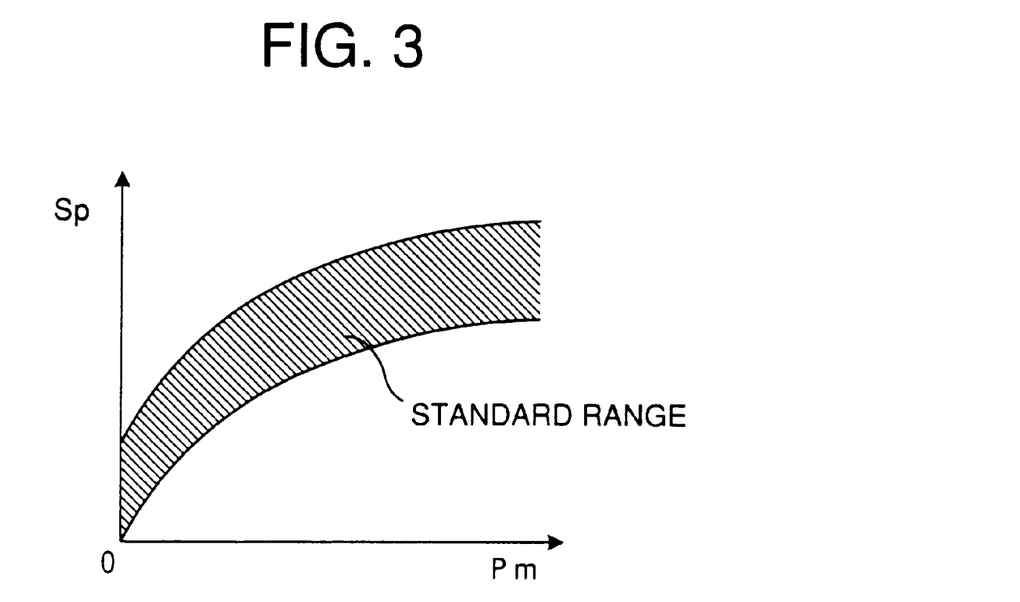
FIG. 3 is a graph showing an example of the standard range of correlation between the stroke and the pressure for judging a normal operation of the brake system.

In this connection, if the width of a standard range of Sp vs. Pm pattern such as shown in FIG. 3 by a hatching is broadened to give an allowance for changes of the performance pattern due to variations of the actuation of the brake pedal by drivers, there will arise a problem that when the normal operation of the brake system was lost within the allowance range, a certain fault actually occurred in the brake system, even small, continues without being detected.

SUMMARY OF THE INVENTION

In view of the above-mentioned problems, it is a primary object of the present invention to provide a device for judging a normal operation of a brake system of a vehicle such as an automobile, improved not to make a mistake in the judging of the normal operation of the brake system due to variations of actuation thereof by drivers.

The above-mentioned primary object is accomplished by a device for judging a normal operation of a brake system of a vehicle such as an automobile having wheels, the brake system comprising wheel cylinders each applying a braking force to each corresponding one of the wheels by a supply of a pressurized brake fluid thereto, a brake pedal, and a master cylinder for generating the pressurized brake fluid according to a depression of the brake pedal by a driver, the device comprising:

means for detecting a stroke of the depression of the brake pedal by the driver, means for detecting a pressure of the brake fluid pressurized by the master cylinder according to the depression of the brake pedal, and means for judging if the stroke detected by the stroke detection means and the pressure detected by the pressure detection means are correlated with one another within a range determined for a judgment of a normal operation of the brake system, wherein the device further comprises at least one of means for detecting speed of change of the stroke detected by the stroke detection means and means for detecting speed of change of the pressure detected by the pressure detection means, and means for restraining the judgment means from making the judgment operation thereof based upon a standard range of the correlation between the stroke and the pressure when at least one of the stroke change speed and the pressure change speed is not smaller than a threshold value determined therefor.

By detecting if at least one of the change speed of the brake depression stroke and the change speed of the pressure of the brake fluid pressurized by the master cylinder is not smaller than a threshold value determined therefor, and by restraining the judgment means from making the judgment operation based upon the standard range of the correlation between the stroke and the pressure when at least one of the stroke change speed and the pressure change speed is not smaller than the threshold value, the device for judging a normal operation of a brake system of a vehicle can operate to judge the normal operation of the brake system based upon a correlation performance between the brake depression stroke and the master cylinder pressure by keeping the standard correlation performance to be of a width narrow enough to enable any small fault be judged, while avoiding a misjudgment of the normal operation of the brake system due to variations of actuation of the brake pedal by drivers.

The device of the above-mentioned construction may further comprise means for providing an allowance range of correlation between the stroke and the pressure on at least one side of the standard range thereof when at least one of the stroke change speed and the pressure change speed is not smaller than the threshold value so that the judgment means judge if the stroke detected by the stroke detection means and the pressure detected by the pressure detection means are correlated with one another within the allowance range for the judgment of the normal operation of the brake system when at least one of the stroke change speed and the pressure change speed is not smaller than the threshold value.

In this case, the means for providing the allowance range of correlation between the stroke and the pressure may be adapted to produce the allowance range to have a width proportional to the magnitude of the stroke change speed.

Or, alternatively, the means for providing the allowance range of correlation between the stroke and the pressure may be adapted to produce the allowance range to have a width proportional to the magnitude of the pressure change speed.

It will be noted, as a matter of course, that the allowance ranges may be provided at opposite sides of the standard range.

As a further modification, the means for providing the allowance range of correlation between the stroke and the pressure may be adapted to provide selectively one of a plurality of allowance ranges prepared beforehand therefor according to the magnitude of the stroke change speed.

Or alternatively, the means for providing the allowance ranges of correlation between the stroke and the pressure may be adapted to provide selectively one of a plurality of allowance ranges prepared beforehand therefor according to the magnitude of the pressure change speed.

BRIEF DESCRIPTION OF THE DRAWINGS

In the accompanying drawings.

DESCRIPTION OF THE EMBODIMENTS

In the following, the present invention will be described in more detail in the form of some preferred embodiments thereof with reference to the accompanying drawings.

Figure 1A:
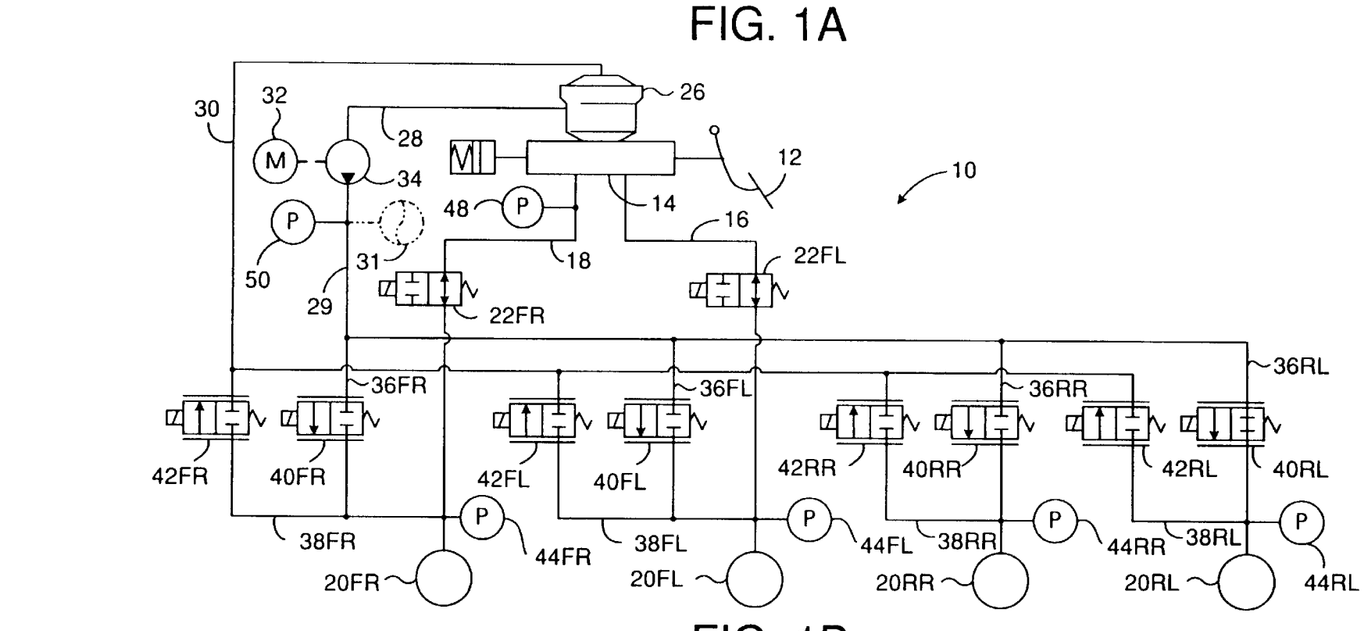
FIG. 1A is a diagram showing an example of the hydraulic circuit of a brake system of a vehicle in which the device for judging a normal operation of a brake system of a vehicle according to the present invention is incorporated.

Referring to FIG. 1A, the hydraulic circuit totally designated by 10 of a brake system of a vehicle not shown in the figure and having pairs of front and rear wheels not shown in the figure comprise wheel cylinders 20FR, 20FL, 20RR and 20RL for applying braking forces to front right, front left, rear right and rear left ones of the wheels, respectively. The hydraulic circuit comprises a master cylinder 14 adapted to compress a brake fluid supplied from a reservoir 26 according to a depression of a brake pedal 12 by a driver, so as to deliver a pressurized brake fluid through passages 16 and 18 toward the wheel cylinders 20FL and 20FR, respectively. On-off valves 22FL and 22FR are provided in the passages 16 and 18, respectively, so as normally not to obstruct communication of the passages 16 and 18, while selectively interrupting the communication of the passages 16 and 18, respectively. Indeed, the on-off valves 22FL and 22FR are solenoid actuated valves which are maintained in a through open condition such as shown in the figure when no electric current is supplied thereto, while they are changed over to a position interrupting the communication of the passages 16 and 18, respectively, when they are supplied with an electric current when an ignition switch (not shown) is turned on, desirably on an additional condition that the voltage of a battery (not shown) of the vehicle is not lower than a normal threshold level.

34 is a pump adapted to be selectively driven by an electric motor 32 powered by the afore-mentioned battery via control means 52 shown in FIG. 1B and described hereinbelow, so as to pump up the brake fluid supplied from the reservoir 26 through a suction passage 28 for providing a pressurized source of the brake fluid in an outlet passage 29 branching to passages 36FR, 36FL, 36RR and 3GRL for supplying the pressurized brake fluid to the wheel cylinders 20FR, 20FL, 20RR and 20RL through on-off valves 40FR, 40FL, 40RR and 40RL, respectively. An accumulator 31 may be connected to the outlet passage 29. The on-off valves 40FR, 40FL, 40RR and 40RL are each of a normally closed type which maintains each of the supply passages 36FR, 36FL, 36RR and 36RL in an interrupted condition when no electric current is supplied thereto, and is selectively opened by a supply of an actuating electric current thereto.

The wheel cylinders 20FR, 20FL, 20RR and 20RL are exhaustible through exhaust passages 38FR, 38FL, 38RR and 38RL including on-off valves 42FR, 42FL, 42RR and 42RL, respectively, toward an exhaust passage 30 leading to the reservoir 26. The on-off valves 42FR, 42FL, 42RR and 42RL are each also of a normally closed type which maintains each of the exhaust passages 38FR, 38FL, 38RR and 38RL in an interrupted condition when no electric current is supplied thereto, and is selectively opened by a supply of an actuating electric current.

The pressures of the brake fluid in the wheel cylinders 20FR, 20FL, 20RR and 20RL axe detected by pressure sensors 44FR, 44FL, 44RR and 44RL, respectively. The pressure of the brake fluid compressed by the master cylinder 14 is detected by a pressure sensor 48. The pressure of the brake fluid in the outlet passage 29 is detected by a pressure sensor 50.

Figure 1B:
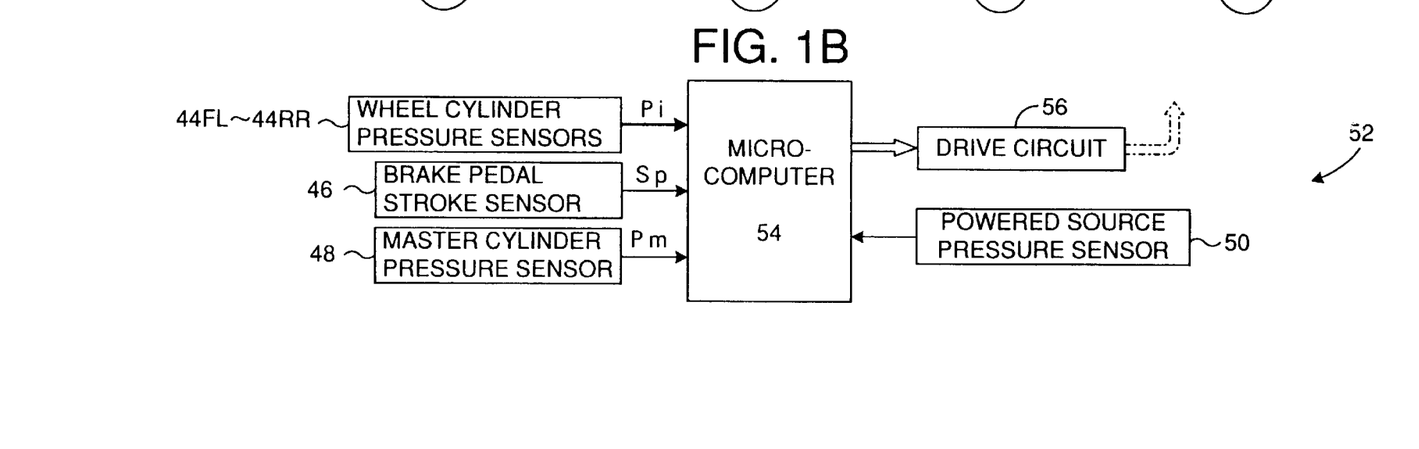
FIG. 1B is a diagram showing a basic construction of the brake control system in which the normal operation judging device according to the present invention is incorporated.

The changeover of each of the on-off valves 22FR and 22FL, the on-off valves 40FR–40RL and the on-off valves 42FR–42RL is controlled by control means 52 diagrammatically shown in FIG. 1B, or in more detail, by a microcomputer 54 thereof through a drive circuit 56 thereof. The microcomputer may be of a common type including a central processor unit (CPU), a read only memory (ROM), a random access memory (RAM), input and output port means and bilateral bus means interconnecting these elements, all not shown in detail in the figure. The microcomputer 54 is supplied with signals of pressures Pi (i=fr, fl, rr and rl) of the brake fluid in the corresponding wheel cylinders from the wheel cylinder pressure sensors 44FL–44RR, a signal of depression stroke Sp of the brake pedal 12 by a driver from a brake pedal stroke sensor 46, a signal of master cylinder pressure Pm of the brake fluid compressed by the master cylinder 14 from the master cylinder pressure sensor 48, and the pressure of the brake fluid in the pump outlet passage 29 from the powered source pressure sensor 50, and carries out certain control calculations based upon the values of the parameters input by the signals from the sensors 44FL–44RR, 46, 48 and 50 for determining the pressure of the brake fluid to be established in each of the wheel cylinders 20FR–20RL at each moment of the operation of the vehicle as described in detail hereinunder, and controls the on-off valves 22FR and 22FL, 40FR–40RL and 42FR–42RL together with an on-off operation of the electric motor 32 via the drive circuit 56.

In the course of the execution of a certain brake control such as, for example, proposed by co-pending application No. (1205), the device for judging a normal operation of a brake system according to the present invention, which is indeed incorporated in the microcomputer 54 as a functional part thereof, operates to judge if the brake system composed of the hydraulic circuit 10 and the control means 52 is operating normally.

The device of the present invention will now be described in detail in the form of its operation with respect to some preferred embodiments thereof.

Figure 2:
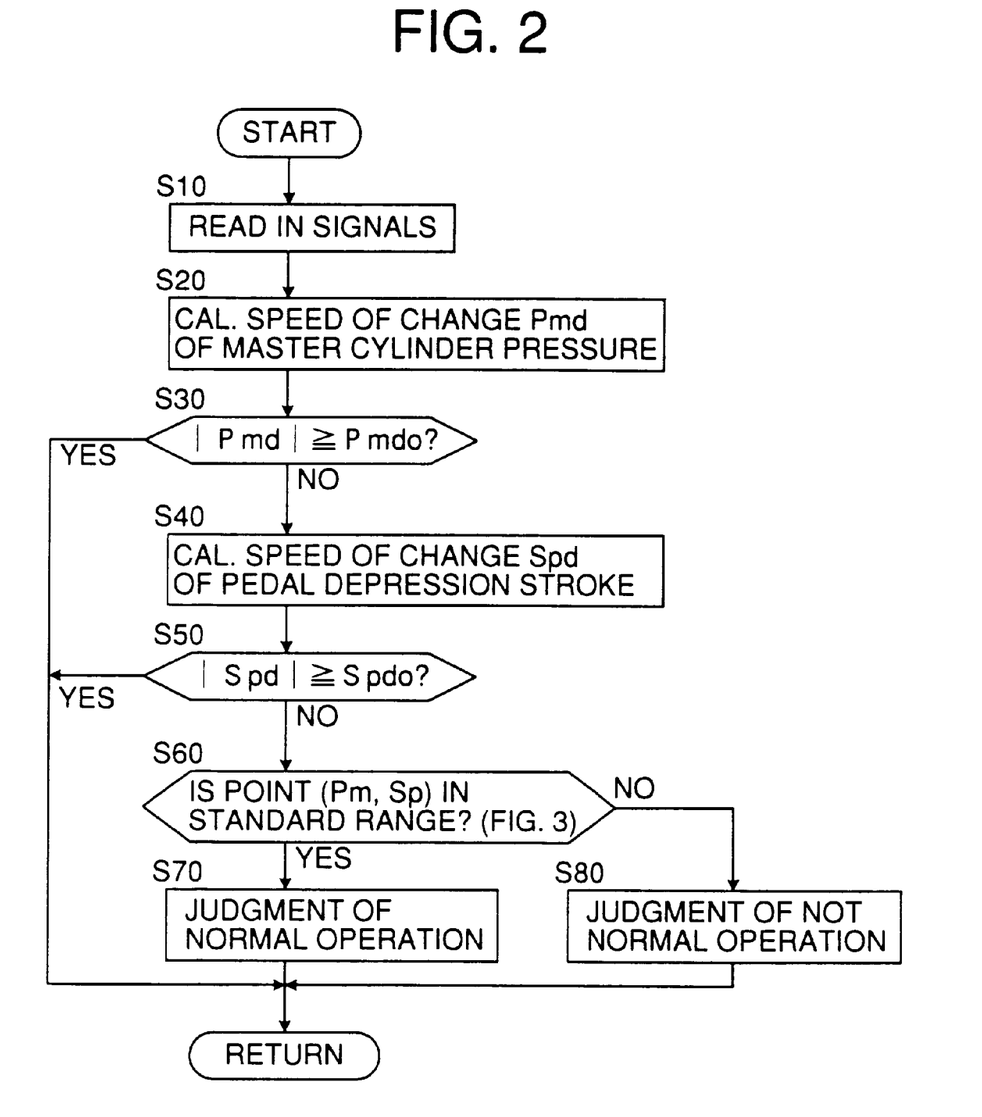
FIG. 2 is a flowchart showing a first embodiment of the brake system normal operation judging device according to the present invention in the form of its operation.

Referring to FIG. 2, showing a first embodiment of the device of the present invention in the form of its operation by a flowchart, when its operation is started preferably at a predetermined cyclic timing in relation to the brake control operation of the microcomputer 54, in step 10, signals such as the master cylinder pressure Pm and the brake depression stroke Sp are read in from the corresponding sensors for the purpose of operation of the device of the present invention.

In step 20, speed of change, i.e. change rate, of the master cylinder pressure Pm is calculated as Pmd.

In step 30, it is judged if the absolute value of Pmd is equal to or greater than a threshold value Pmdo predetermined therefor. When the answer of step 30 is no, the operation process proceeds to step 40.

In step 40, speed of change, i.e. change rate, of the brake pedal depression stroke Sp is calculated as SPd.

In step 50, it is judged if the absolute value of Spd is equal to or greater than a threshold value Spdo predetermined therefor. When the answer of step 50 is no, the operation process proceeds to step 60.

In step 60, it is judged if the point of (Pm, Sp) according to the values of Pm and Sp read in in step 10 is in the hatched range of the graph of FIG. 3 which specifies a standard range for the normal relationship between the master cylinder pressure and the brake pedal depression stroke, indicating that the brake system is operating normally. When the answer of step 60 is yes, the operation process proceeds to step 70, whereas when the answer is no, the operation process proceeds to step 80.

In step 70, the device makes a judgment that the brake system is normally operating, whereas in step 80 the device makes a judgment that the brake system is not normally operating. After step 70 or 80, the operation process returns for the next restart.

On the other hand, when the answer is yes in step 30 or 50, i.e. when the speed of change of the master cylinder pressure Pm or the speed of change of the brake pedal depression stroke Sp is equal to or greater than, i.e. not smaller than, the threshold value Pmdo or Spdo, the operation process immediately returns for the next restart, i.e. the device is no further operated at this time of judging operation. By such an arrangement, it is avoided that the brake system is inappropriately judged about if it is normally operating or not by reference to such a standard range of correlation between the brake pedal depression stroke and the master cylinder pressure generated thereby as shown in FIG. 3 during an unusually quick operation of the brake pedal by a driver, resulting probably in a judgment that the brake system in not normally operating, while the above-mentioned standard range may be maintained to be narrow enough to ensure a high performance of the device for judging the normal operation of the brake system so as to be able to judge if there is really any fault in the brake system, even when it is very small.

Figure 4:
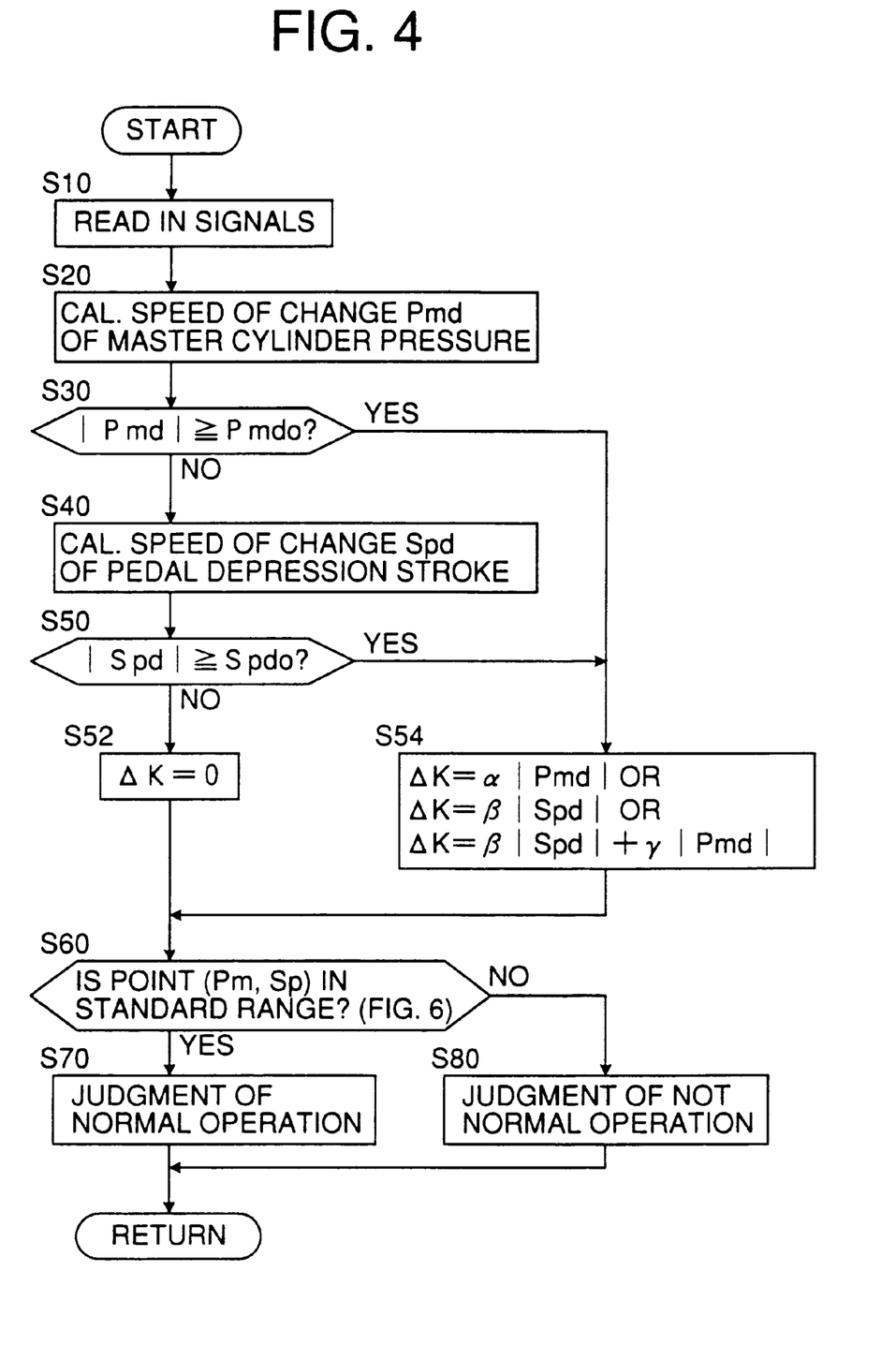
FIG. 4 is a flowchart similar to that of FIG. 2, showing a second embodiment of present invention.

FIG. 4 shows a second embodiment of the device of the present invention in a flowchart similar to that of FIG. 2. This second embodiment is a partial modification of the first embodiment. Therefore, in the flowchart of FIG. 4, the steps corresponding to those shown in the flowchart of FIG. 2 are designated by the same step numbers as in the flowchart of FIG. 2.

Figure 6:
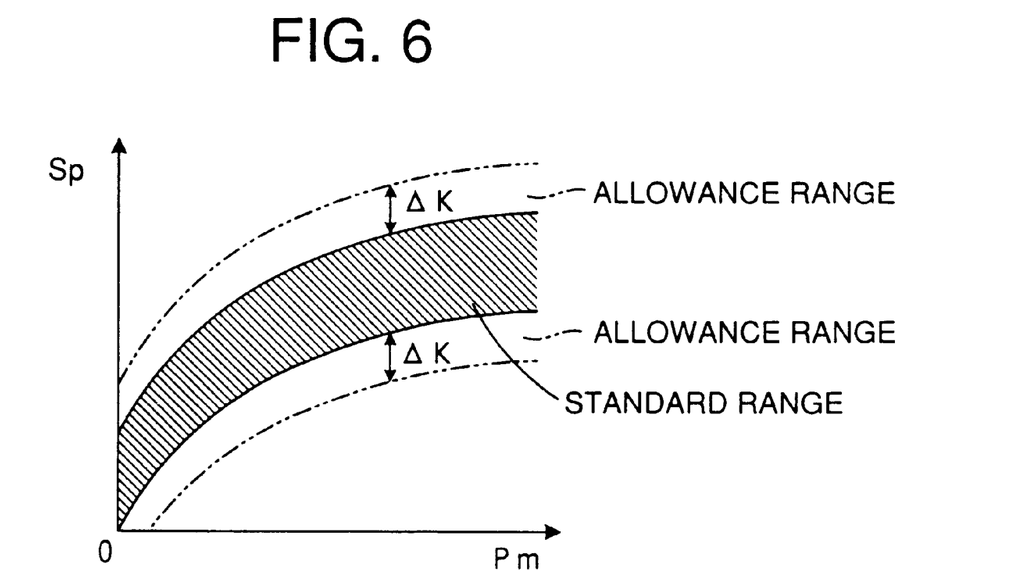
FIG. 6 is a graph similar to that of FIG. 3, showing the standard range of correlation between the stroke and the pressure for judging a normal operation of the brake system, with allowance ranges of correlation added to opposite sides of the standard range according to a modification corresponding to the flowchart of FIG. 4.

In this second embodiment, when it was judged in step 30 or 50 that the absolute value of Pmd or Spd is equal to or greater than, i.e. not smaller than, Pmdo or Spdo, respectively, the operation of the device is not immediately ended as in the first embodiment, but in step 54 an allowance range of a width ΔK is provided on each of opposite sides of the standard range as shown in FIG. 6. The value of ΔK may be calculated as follows:

$$\Delta K = \alpha |Pmd|$$

when the operation process came from step 30, or $$\Delta K = \beta |Spd|$$

or $$\Delta K = \beta |Spd| + \gamma |Pmd|$$

when the operation process came from step 50, by determining appropriate proportioning factors α, β and γ.

As an alternative, steps 20–50 may be rearranged such that |Spd|≧Spdo? is judged earlier than |Pmd|≧Pmdo?, and in step 54 ΔK is calculated as follows:

$$\Delta K = \beta |Spd|$$

when the operation process came from step 30, judging if |Spd| is equal to or greater than Spdo, or $$\Delta K = \alpha |Pmd|$$

or $$\Delta K = \alpha |Pmd| + \delta |Spd|$$

when the operation process came from step 50, judging if |Pmd| is equal to or greater than Pmdo, by similarly determining appropriate proportioning factors α, β and δ.

When both |Pmd| and |Spd| are smaller than Pmdo and Spdo, respectively, the operation process proceeds to step 52, where ΔK is set to zero, and then the brake system is judged for its normal operation based upon the standard range in the same manner as in the first embodiment of FIG. 2.

Therefore, by the modification of the embodiment of FIG. 4, the device of the present invention is further improved such that it can also correctly judge the brake system about its normal operation even during a relatively rough actuation of the brake pedal by the driver.

Figure 5:
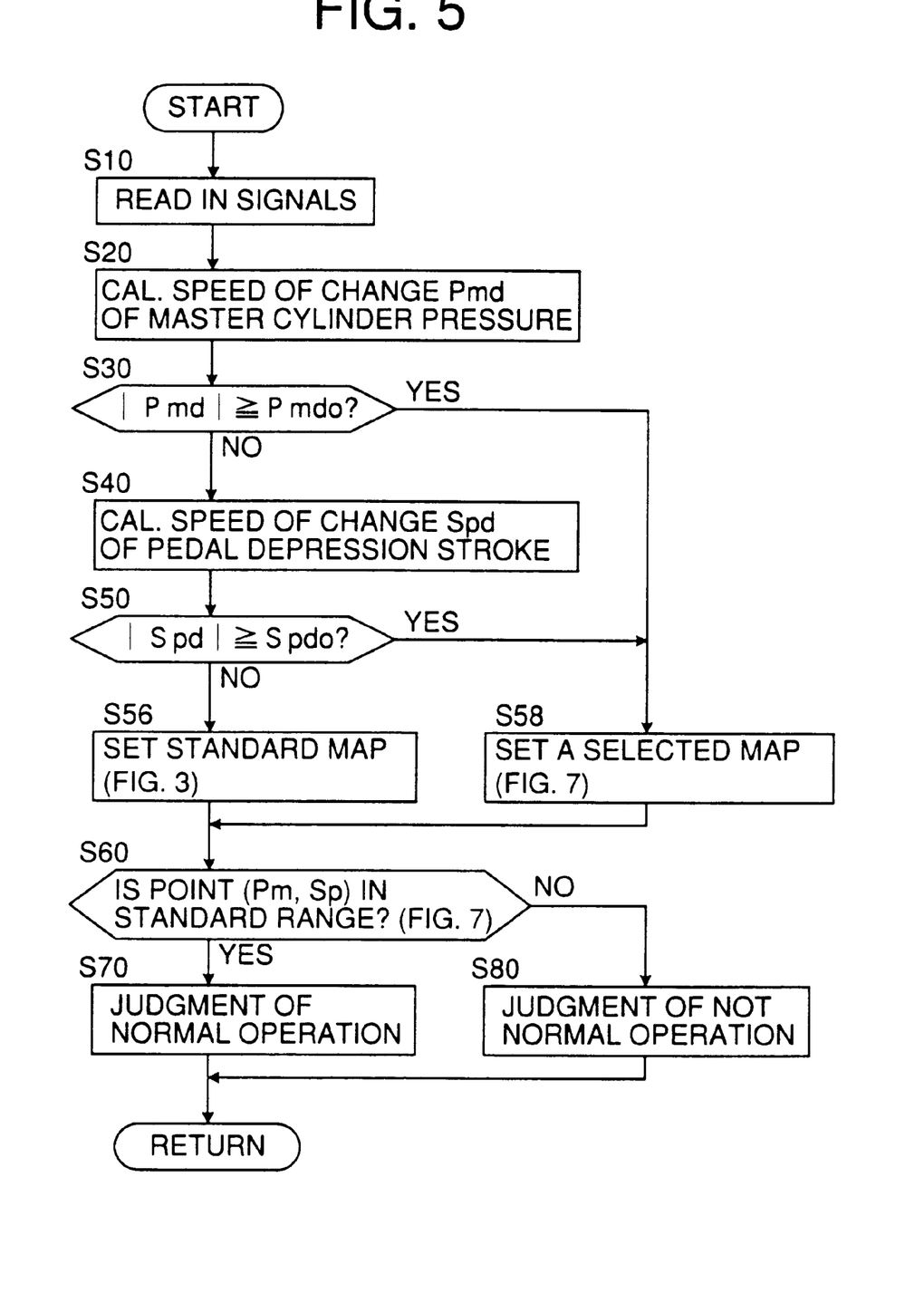
FIG. 5 is a flowchart similar to those of FIGS. 2 and 4, showing a third embodiment of the present invention.

FIG. 5 shows a third embodiment of the device of the present invention in a flowchart similar to those of FIGS. 2 and 4. This third embodiment is also a partial modification of the first embodiment in a manner similar to that of the second embodiment of FIG. 4. Therefore, in the flowchart of FIG. 5, the steps corresponding to those shown in the flowcharts of FIGS. 2 and 4 are designated by the same step numbers as in those of FIGS. 2 and 4.

Figure 7:
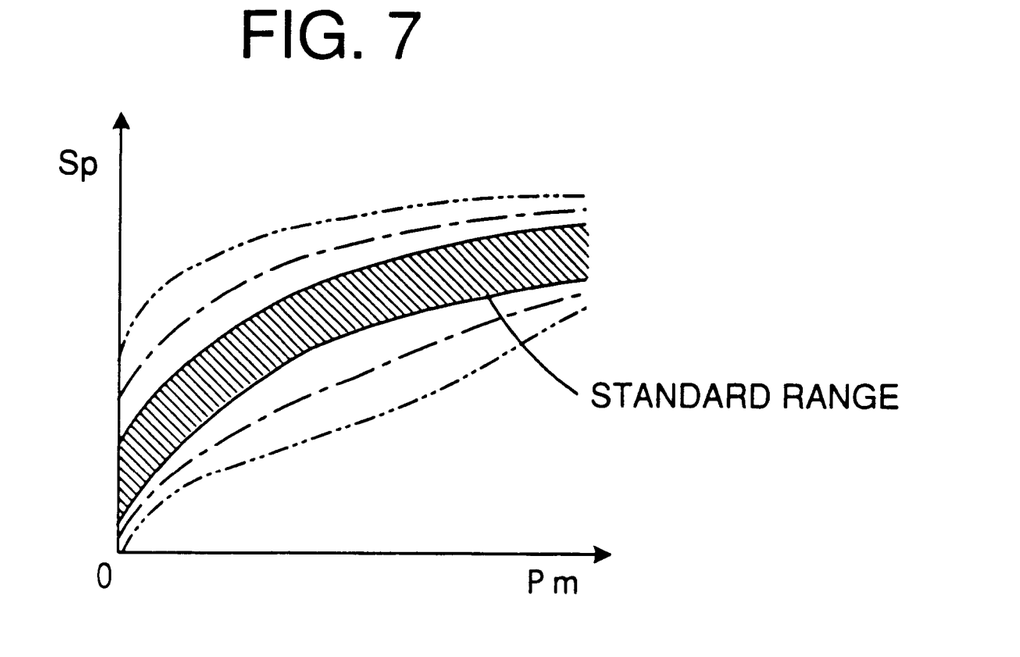
FIG. 7 is a graph similar to those of FIGS. 3 and 6, showing the standard range of correlation between the stroke and the pressure for judging a normal operation of the brake system, with allowance ranges of correlation added to opposite sides of the standard range according to a modification corresponding to the flowchart of FIG. 5.

In this third embodiment, when the judgment of step 30 or 50 is yes, in step 58 the map for judging the point of (Pm, Sp) for the correlation therebetween is modified to include one or more allowance ranges on each side of the standard range as shown in FIG. 7, so that the judging of the brake system about if it is operating normally or not is made by selectively adding these allowance ranges to the standard range according to the extent of |Pmd| and/or |Spd| exceeding Pmdo and/or Spdo, respectively.

When |Pmd| and |Spd| are smaller than Pmdo and Spdo, respectively, then in step 56 the map is set up as that of FIG. 3 including only the standard range.

Therefore, it will be appreciated that the third embodiment has more flexibility than the second embodiment in judging the brake system for its normal operation with regard to the actuating conditions of the brake pedal by the driver, while ensuring the same high reliability guaranteed by the standard range of the correlation between the master cylinder and the brake pedal depression stroke against a standard actuation of the brake pedal at a standard speed of change of brake pedal depression stroke.

Although the present invention has been described in detail with respect to some preferred embodiments thereof, it will be apparent for those skilled in the art that various modifications are possible with respect to the shown embodiments within the scope of the present invention.

What is claimed is:

1. A device for judging a normal operation of a brake system of a vehicle such as an automobile having wheels, the brake system comprising wheel cylinders each applying a braking force to each corresponding one of the wheels by a supply of a pressurized brake fluid thereto, a brake pedal, and a master cylinder for generating the pressurized brake fluid according to a depression of the brake pedal by a driver, the device comprising:

means for detecting a stroke of the depression of the brake pedal by the driver, means for detecting a pressure of the brake fluid pressurized by the master cylinder according to the depression of the brake pedal, and means for judging if the stroke detected by the stroke detection means and the pressure detected by the pressure detection means are correlated with one another within a range determined for a judgment of a normal operation of the brake system, wherein the device further comprises at least one of means for detecting speed of change of the stroke detected by the stroke detection means and means for detecting speed of change of the pressure detected by the pressure detection means, and means for restraining the judgment means from making the judgment operation thereof based upon a standard range of the correlation between the stroke and the pressure when at least one of the stroke change speed and the pressure change speed is not smaller than a threshold value determined therefor.

2. A device according to claim 1, further comprising means for providing an allowance range of correlation between the stroke and the pressure on at least one side of the standard range thereof when at least one of the stroke change speed and the pressure change speed is not smaller than the threshold value so that the judgment means judge if the stroke detected by the stroke detection means and the pressure detected by the pressure detection means are correlated with one another within the allowance range for the judgment of the normal operation of the brake system when at least one of the stroke change speed and the pressure change speed is not smaller than the threshold value.

3. A device according to claim 2, wherein the means for providing the allowance range of correlation between the stroke and the pressure are adapted to produce the allowance range to have a width proportional to the magnitude of the stroke change speed.

4. A device according to claim 2, wherein the means for providing the allowance range of correlation between the stroke and the pressure are adapted to produce the allowance range to have a width proportional to the magnitude of the pressure change speed.

5. A device according to claim 2, wherein the means for providing the allowance range of correlation between the stroke and the pressure are adapted to provide selectively one of a plurality of allowance ranges prepared beforehand therefor according to the magnitude of the stroke change speed.

6. A device according to claim 2, wherein the means for providing the allowance ranges of correlation between the stroke and the pressure are adapted to provide selectively one of a plurality of allowance ranges prepared beforehand therefor according to the magnitude of the pressure change speed.

* * * * *